US006961931B2

(12) United States Patent
Fischer (10) Patent No.: US 6,961,931 B2
(45) Date of Patent: Nov. 1, 2005

(54) DEPENDENCY SPECIFICATION USING TARGET PATTERNS

(75) Inventor: Stephen E. Fischer, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 09/757,517

(22) Filed: Jan. 10, 2001

(65) Prior Publication Data

US 2002/0129347 A1 Sep. 12, 2002

(51) Int. Cl.$^7$ ................................................. G06F 9/44
(52) U.S. Cl. ........................................ 717/168; 717/120
(58) Field of Search .............................. 717/100, 120, 717/136–178, 168

(56) References Cited

U.S. PATENT DOCUMENTS

| | | | | | |
|---|---|---|---|---|---|
| 4,931,928 A | * | 6/1990 | Greenfeld | ................... | 717/131 |
| 5,182,807 A | * | 1/1993 | Mizuse et al. | ............... | 717/122 |
| 5,278,979 A | * | 1/1994 | Foster et al. | ................. | 707/203 |
| 5,313,387 A | * | 5/1994 | McKeeman et al. | .......... | 700/90 |
| 5,353,433 A | | 10/1994 | Sherman | | |
| 5,812,812 A | | 9/1998 | Afsar et al. | | |
| 5,854,932 A | * | 12/1998 | Mariani et al. | ............. | 717/116 |
| 5,872,957 A | | 2/1999 | Worthington et al. | | |
| 5,892,951 A | * | 4/1999 | Safonov | ..................... | 717/144 |
| 5,956,513 A | | 9/1999 | McLain, Jr. | | |
| 5,966,541 A | * | 10/1999 | Agarwal | ..................... | 717/132 |
| 5,978,585 A | * | 11/1999 | Crelier | ....................... | 717/145 |
| 5,978,586 A | * | 11/1999 | Baisley et al. | .............. | 717/158 |
| 6,067,637 A | * | 5/2000 | Auer et al. | ................... | 714/26 |
| 6,305,010 B2 | * | 10/2001 | Agarwal | ..................... | 717/126 |
| 6,594,822 B1 | * | 7/2003 | Schweitz et al. | ........... | 717/140 |

FOREIGN PATENT DOCUMENTS

JP          06051964 A      2/1994

OTHER PUBLICATIONS

The GNU Make Manual, Version 3.79, edition 0.55, (Apr. 4, 2000), p. 1–187.*
Welsh, "Practical Programming in Tcl and Tk", (1999), p. xivi–xivii and 132.*
IBM Technical Disclosure Bulletin, "Visual Make Utility", vol. 39, No. 02, (Feb. 1996) pp363–366.

* cited by examiner

Primary Examiner—Tuan Dam
Assistant Examiner—Andre R. Fowlkes
(74) Attorney, Agent, or Firm—DeLio & Peterson, LLC; Kelly M. Reynolds; Jay H. Anderson (57) ABSTRACT

A method for generating changes and updating existing files and code in a computer program, wherein the method comprises reading existing source code and existing object code in the computer program. Then, reading a plurality of associated files to the source code, and executing a utility program. The utility program updates the target source code and the object code associated with the target source code. Targets may be specified with either glob-type patterns using the standard shell wild cards, or regular expression patterns. The utility program also includes scripting language and can specify particular characters to search for in the target code and the associated code. A target code list is generated for the source code and the associated object code by using the utility program, and the target code and the associated code are updated by employing a search technique specified in the utility program.

24 Claims, 4 Drawing Sheets

DEPENDENCY SPECIFICATION USING TARGET PATTERNS

BACKGROUND OF THE INVENTION

1. Field of the Invention

This invention relates to a method for updating of source code and object code in a computer program and, more particularly, a software utility program for automating selective updates of source code and corresponding object code.

2. Description of Related Art

The relevant prior art, upon which the present invention includes improvements to, is the make utility originally developed to run on UNIX® systems. A brief discussion of the make command or utility in a UNIX environment is herein discussed to serve as background in disclosing the present invention. The make utility is a software engineering tool for managing and maintaining computer programs. Typically, a program may consist of many component files, and as the number of files in the program increases, the compile time also increases. Similarly, the complexity of compilation commands can increase with the program complexity. In the same way, the likelihood of human error in executing many compilation commands and updating source files can also increase with the program complexity.

The make utility uses a descriptor file containing dependency rules, macros, and suffix rules to instruct make to automatically rebuild the program whenever one of the program component files is modified. The make utility operates by following rules that are provided in its descriptor file, typically called makefile. The make utility saves compile time by selectively recompiling only the files that were effected by changes. Thus, the make utility simplifies the problem of keeping track of modified files, recompiling files, and re-linking those files to produce an executable program.

However, the make command is usually written using shell commands or make syntax. This does not include other languages that may offer greater flexibility for the programmer and greater flexibility in operation of the utility.

The make file includes two elements: targets, and dependencies. The make utility works by comparing the time stamp of each target and its dependencies. If at least one prerequisite file (such as a source file) is newer than the associated target file (such as an associated object file), the make file executes a typical rule, for example, recompiling a source file.

The make utility is mostly used to sort out dependency relations among files. Generally, even relatively small software projects involve a number of files that depend upon each other. For example, a program must be linked from object files, which in turn must be created from assembly language or high-level language source files. If one or more source files are modified, the program must be re-linked after recompiling some, but not necessarily all, of the sources. This selective building is normally repeated many times during the course of the project. It is this process that the make utility addresses. However, the make utility requires explicitly detailing the source files or target files needing to be changed or updated which can take significant amounts of time and be cumbersome. Also, the make command requires building a substantially complete dependency tree before it starts, which can also take an extensive amount of time and computer resources.

Typically, a programmer records all the relationships among set files, and then uses the make utility to automatically perform all updating tasks. The make command has this general form: "make myprog". The make utility then carries out only those tasks necessitated by source file changes since the previous make command. For example, the make utility examines the file system to determine when the relevant files were last modified. If file A depends on file B, and if B was modified after A, then A must be remade-compiled, linked, edited, substituted in a library.

The command, "make myprog" (where "myprog" is a target program), indicates that the programmer wants to update the version of the program, named "myprog". Thus, if "myprog" is an executable file, the command indicates the desire to perform all necessary compilation and linking required to create the file. Instead of entering a great many compiler commands, the make utility automates the process. The program requiring an update ("myprog" in the above example) is called the target of the operation. The program is built from one or more associated files called prerequisites or dependents. Each of these files, may in turn, have other files as prerequisites or dependents. For instance, executable programs are built by linking object files. When source files have changed, typically it is desirable to recompile the object files before linking. Thus, each source file is the prerequisite for each object file.

The make utility is sensitive to hierarchies and dependencies, such as source to object, and object to executable relationships. The programmer is responsible for specifying some dependencies in a description file, however, make can determine many dependencies for itself. In deciding which files to build and how to build them, make draws on the names of existing files, the last modified kinds of the files, and a set of built in rules. With this background, a command, like, "make myprog", operates such that all necessary parts of the hierarchy are updated.

Thus, the make utility was created to help programmers manage software development projects and files associated with those projects. The need for such a tool as the make command stems from typical scenarios encountered by programmers and software developers. For example, if a programmer is working on a number of programs that will be compiled and linked together to form a single executable program, every time a file is changed the file must be recompiled, then re-linked with the existing object file to create a new executable program.

This sequence presents a significant problem in which the programmer has to remember which files have been modified and, consequently, which files have to be recompiled. Thus, recompiling soon becomes a cumbersome and a difficult task prone to errors and omissions. The make utility handles many details in compiling modified files. To accomplish the task, make follows a set of rules that are provided in a special file called a makefile.

More specifically, make operates by comparing the date and time of a source file with the date and time of the associated object file. Together, the date and time are called the time stamp. If the comparison shows that the source file is newer than the object file, or if the object file does not exist, make performs the task listed in the make file to convert the source file into an object file. In contrast, if the object file is newer then the source file, then make recognizes that is does not have to recompile the source file.

The make utility requires that a target/dependency line must begin in the first column of the line. A command line must be indented. A target is a name followed by a colon. The name appears at the beginning of the line. Two types of dependencies occur in a make file, direct dependencies and indirect dependencies. A direct dependency appears with the target. This means that the target depends on the file or files listed after the colon. An indirect dependency is indirectly related to the first target. However, typically, multiple makefiles are needed to specify cross-directory file dependencies.

Bearing in mind the problems and deficiencies of the prior art, it is therefore an object of the present invention to provide a utility program which more rapidly and efficiently updates target files and their corresponding dependent files.

It is another object of the present invention to provide a utility program using a more flexible programming language.

A further object of the invention is to provide a more effective search technique requiring less intensive computer resources and increased efficiency in the searching process.

It is yet another object of the present invention to provide a utility program which more effectively finds target files.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for updating existing code in a computer program after inputting new code which defines changes to the existing code, wherein the method comprises generating a target file list which includes target files, generating an associated file list including associated files which correspond with the target files, and executing an algorithm. The algorithm locates the target files by employing a search process. The algorithm updates the target files and updates the associated files by selectively compiling the target files.

In a related aspect, the present invention provides source code and object code. The target files are source code and the associated files are object code. The source code are selectively compiled to update and provide the associated object code.

In another related aspect, the present invention provides updating the associated file list with new associated files. The new associated files are defined by the new code.

In yet another related aspect, the present invention provides a search technique including pattern type variables which use generic rules to specify the associated object code for updating.

In another aspect, the present invention provides a method for generating changes and updating existing files and code in a computer program wherein the method comprises reading existing source code and existing object code in the computer program. Then the method reads a plurality of associated files, where the associated files are associated with the source code, and executes a utility program which updates target source code and the object code associated with the target source code. The utility program includes scripting language specifying particular characters to search for in the target code and the associated code. The method further generates a target code list for the source code and the associated object code by using the utility program. The method then updates the target code and the associated code by employing a search technique specified in the utility program. The search technique includes specifying patterns such that the specified patterns identify the existing associated code being updated.

In a related aspect, the present invention provides a search technique including matching specified characters in the target code and the associated code such that the specified characters identify the existing associated code being updated.

A related aspect of the present invention provides including specified patterns of the search technique including pattern type variables which use generic rules to specify the associated object code for updating.

In a related aspect, the present invention provides a search technique including pattern type variables which use generic rules to specify the associated object code for updating.

In a further aspect, the present invention provides a method for generating changes and updating existing source code and existing object code in a computer program which includes a plurality of dependent files which are prerequisites of the source files, wherein the method comprises inputting a utility program which updates the target source code and the object code associated with the target source code. The utility program includes a scripting language specifying particular characters to search for in the target code and the associated object code. Further, the method generates a target code list for changing the associated object code using the utility program, and executes a search technique including pattern type variables which use generic rules to specify the associated object code to be changed, and then updates the associated object code.

In a related aspect, the present invention provides a utility program that defines new source code to be added to the existing source code.

In another related aspect, the present invention provides a utility program that prioritizes the target code to update while employing the search technique.

In yet another related aspect, the present invention provides a utility program that includes a process procedure for an operator to call, the process procedure recursively invokes the utility program and arguments.

In still another related aspect, the present invention provides a utility program in a UNIX® environment.

In a related aspect, the present invention provides a utility program that provides that the existing code with a specific character are not considered to be a file, and thereby are bypassed for any changes by the utility program.

In another aspect, the present invention provides a computer program product for updating existing code in a computer program after inputting new code which defines changes to the existing code, wherein the computer program product includes computer readable program code means for generating a target file list which includes target files. The computer program further includes computer readable program code means for generating an associated file list including associated files which correspond with the target files. A computer readable program code means for executing an algorithm is also included where the algorithm locates the target files by employing a search process, the algorithm updates the target files and updates the associated files by selectively compiling the target files.

In yet another aspect, the present invention provides a program storage device readable by a machine, tangibly embodying a program of instructions executable by the machine to perform method steps for updating existing code in a computer program after inputting new code which defines changes to the existing code, wherein the method includes generating a target file list which includes target files. Then, the method generates an associated file list which includes associated files which correspond with the target files, and executes an algorithm which locates the target files by employing a search process. The algorithm updates the target files and updates the associated files by selectively compiling the target files.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–4 of the drawings in which like numerals refer to like features of the invention. Features of the invention are not necessarily shown to scale in the drawings.

The present invention discloses using target patterns to provide a concise way to specify entire classes of dependencies. This method can replace many concrete (non-pattern-specific) rules in a build control file such as the makefile disclosed in the prior art. Other prior art methods use algorithms to build a complete concrete dependency tree before the utility starts. The present invention builds a pattern-based dependency tree instead, which can be done in minimal time without operating system calls. Further, the present invention determines which files match the patterns as needed, thus saving time and computer resources.

Figure 1:
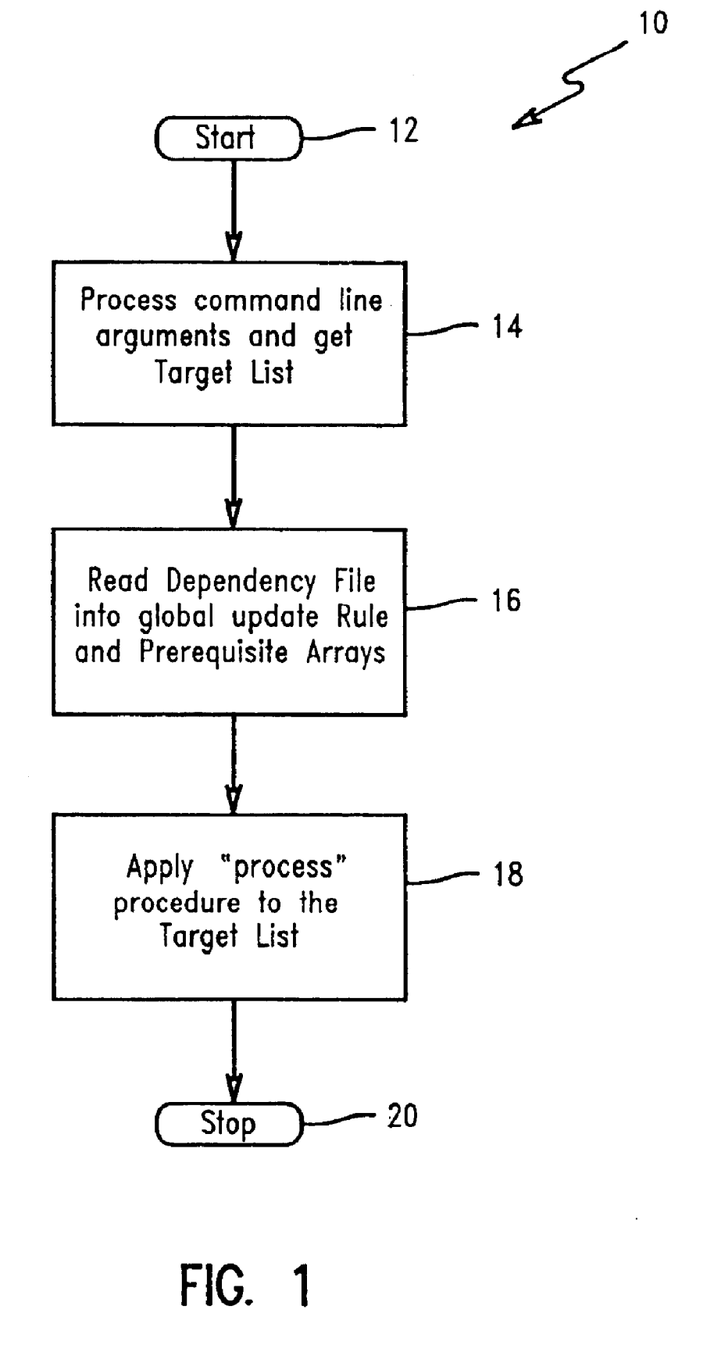
FIG. 1 is a top level flow chart of a preferred embodiment of the present invention.

Referring to FIG. 1, a top-level flow chart is shown disclosing the present invention 10. A preferred embodiment of the present invention is implemented as a utility program called updt. The top-level flow chart of the updt utility program includes five steps 12, 14, 16, 18, and 20. The first step 12 starts the program by entering a command at the command line. The next step 14, includes processing the command line arguments and generating a target list of source files or source code. Next, in step 16, the program reads a dependency file list including object code into the global update rules and in prerequisite arrays. Thus, the program is first retrieving the target list of files or code to update, and then reading what files or code are associated with, or dependent on, that target list of files or code. Then, in step 18, the program applies the process procedure to the target list of object code. The process procedure then updates all target files or code, and the program stops, step 20.

Figure 2:
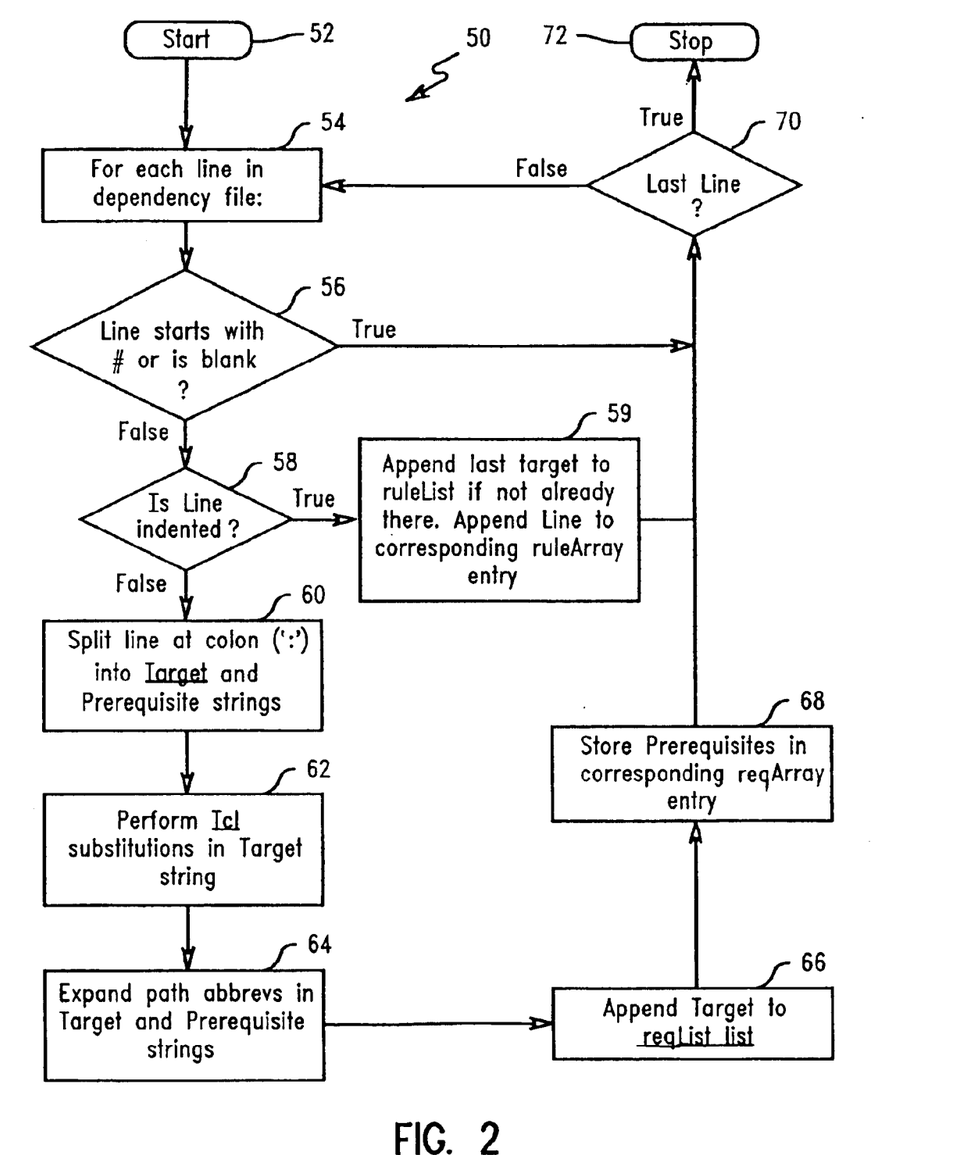
FIG. 2 is flow chart of a sub-process of the embodiment of the present invention shown in FIG. 1.

Referring to FIG. 2, a flow chart is shown disclosing the dependency file read sub-process 50 of the present invention shown in step 16 of FIG. 1. The process starts 52 by having a dependency file to read. Next, each line in the dependency file is read, step 54, by proceeding to a series of "if" statements, steps 56, 58. Then, in step 56, for each line in the dependency file the program ascertains whether the line starts with a pound (#) sign or is blank 56. If the line does not start with a pound sign or is blank this statement is false, and the program continues to look if the line is indented 58, if this is false the program splits the line at the colon (:) mark into target and prerequisite strings.

If at step 56 the line does start with a # or is blank, then the "if" statement at step 56 is true, and the program proceeds to step 70. If at step 58 the line is indented, then the "if" statement is true, and the most recently unentered target is appended to the rule list (if not already there), and the line is appended to corresponding rule array entry 59. Then the program continues to step 70.

After step 60, the program performs Tcl substitutions in a target string 62. Tcl is the preferred programming language in the present embodiment described herein, however, other interpreted programming languages may be used, such as, perl or python®. Then, the path abbreviations are expanded in the target and the prerequisite strings 64. Next, the target is appended to the requisition list 66. Then, prerequisites are stored in corresponding requisite array entries 68. Once this is completed, the program ascertains whether this is the last line 70, if it is the last line the program stops 72, if it is not the last line the program returns to another line in the dependency file, step 54.

Figure 3:
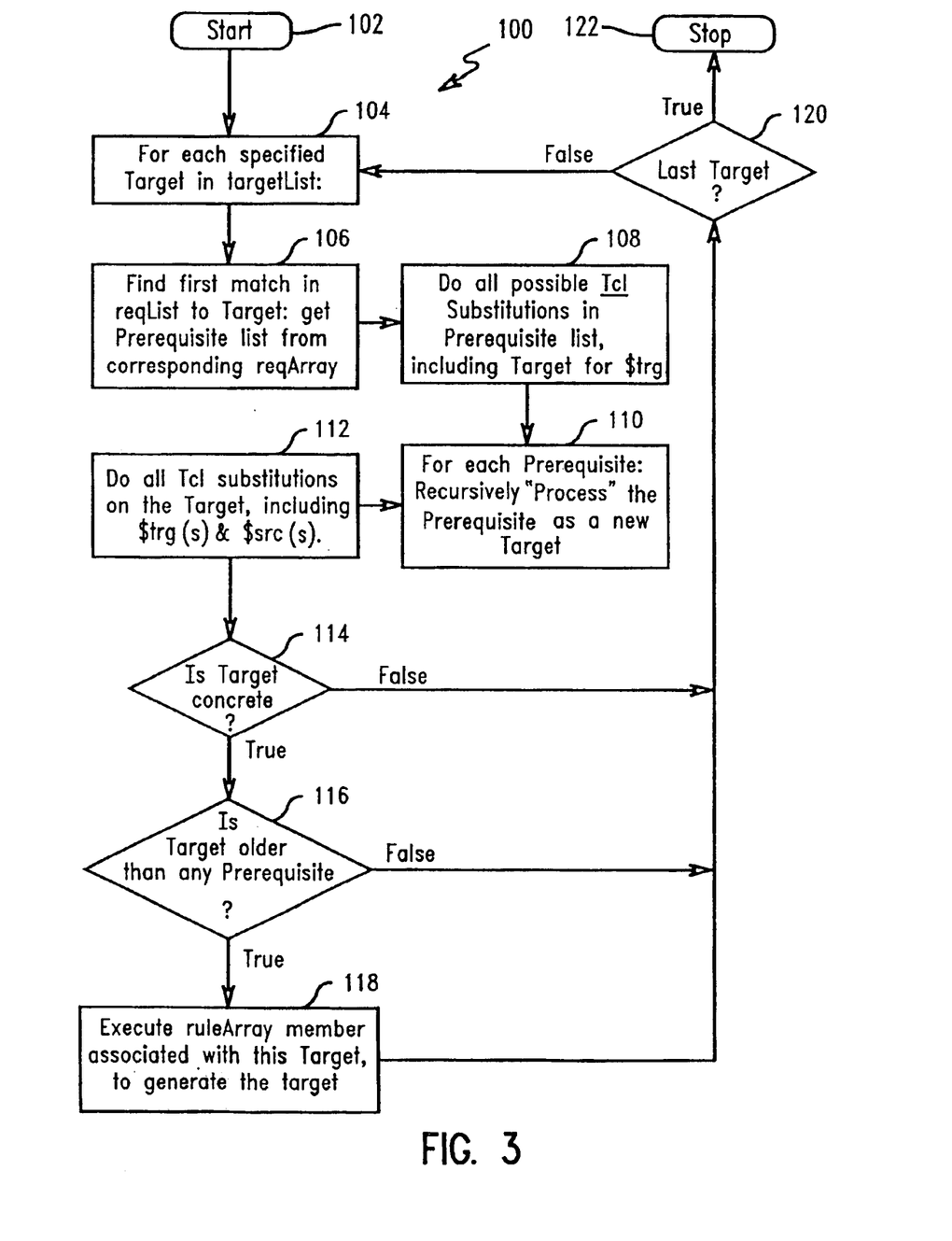
FIG. 3 is a flow chart of another sub-process of the embodiment of the present invention shown in FIG. 1.
Figure 4:
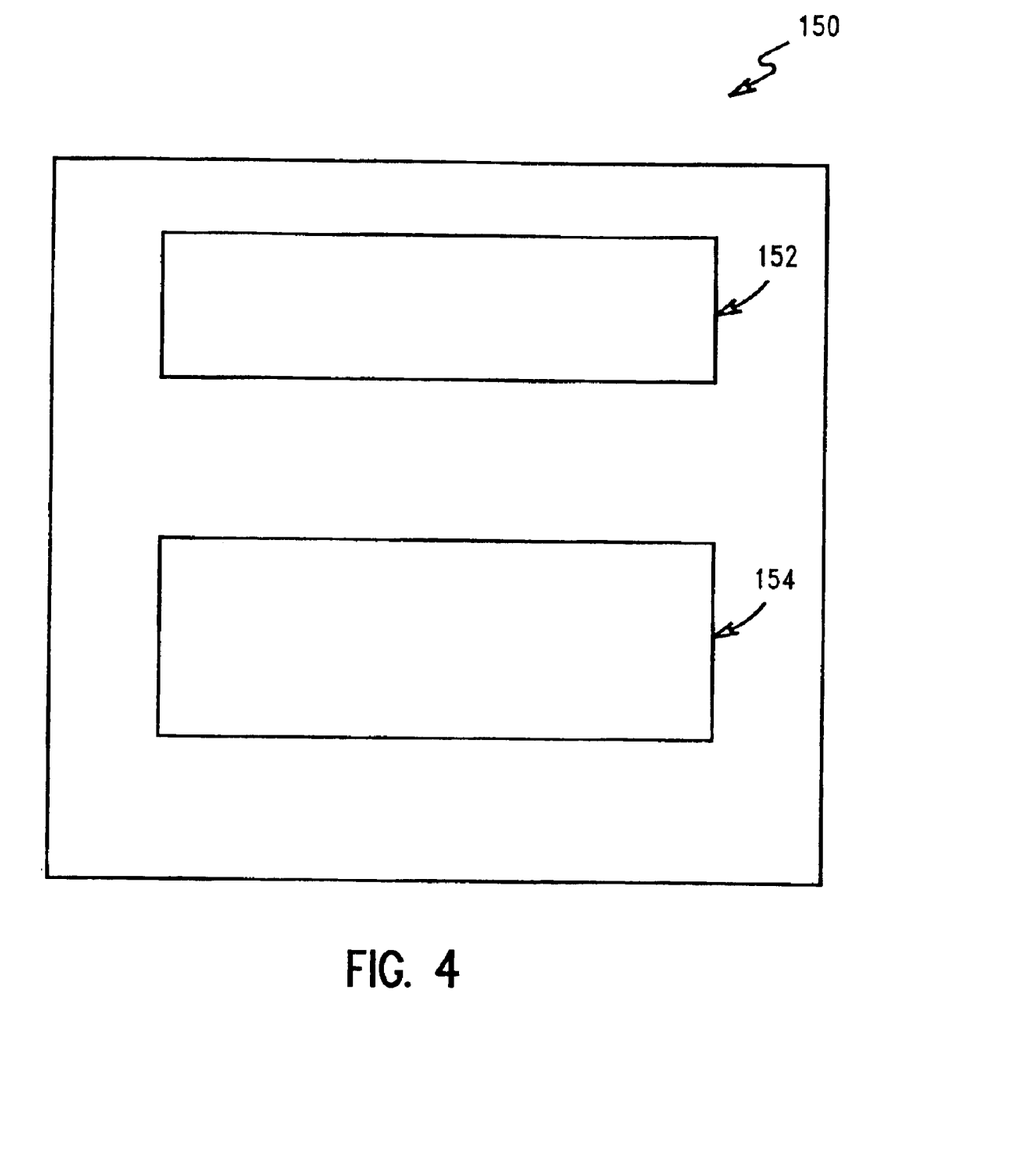
FIG. 4 is a schematic of a computer for running a computer program embodying the method of the present invention.

Referring to FIG. 3, a flow chart is shown disclosing the "process procedure" sub-process 100 of the present invention shown in step 18 of FIG. 1. The process starts with the start command having a target 102. For each specified target in the target list find a first match in the requisition list target then get the prerequisite list from corresponding requisite array 106. Next, do all possible Tcl substitutions in the prerequisite lists, including the target for $trg 108. Then, for each prerequisite recursively process the prerequisite as a new target 110. Next, complete all the TCL substitutions on the target including $trg(s) and $src(s). Then ask if the target is concrete 114, if this is true, ask if the target is older then any prerequisite 116. If this is true, execute the rule array member associated with this target to generate the target 118. After this, ask if this is the last target 120, if this is true, stop 122, if it is false, go back to the beginning 104 and ask for another specified target in the target list.

If the answer to step 114 is false, that is, the target is not concrete, then the process is to go to step 120 to ask if this is the last target. Also, if the answer to step 116 is false, that is the target is not older than any prerequisite, then the process goes to step 120 to ask if this is the last target.

A further description of the present invention, being deployed, is explained below, referring to FIGS. 1, 2, and 3. As shown in FIG. 1, a top level flow chart 10 is shown outlining the basic steps of the present invention. The method of the present invention starts with processing command line arguments to get a target list, step 14. The user types a command (in this preferred embodiment updt) followed by one or more "targets". The computer system then processes the command line instruction, step 14. The preferred embodiment disclosed herein uses a Unix® platform, however other platforms may be used, such as, Microsoft Windows®. The program then processes the command and the target list.

Next, the dependency file is read into the global update rule and prerequisite arrays, step 16. The dependency file describes which files each valid target depends on and also how to generate each target from those files. The dependency file lists the dependent files on the target list. Any target file without an explicit or implicit (I) in its name is assumed to be abstract, i.e., that is, it is not considered to be a file. Target patterns are used to support generic dependency specifications and generic update rules.

Targets may be specified with either glob-type patterns using the standard shell wild cards, or regular expression patterns. This generalization permits the concise specification of entire families of dependencies and/or update rules. This facility is in contrast to prior art (for example, make's suffix rule concept). Further, the dependencies and update rules for a given target need not be specified together. Then, the program applies the process procedure to the target list. Thereafter the program stops 20.

Referring to FIG. 2 the use of the "dependency file read" is further explained. The method for the "dependency file read" starts with each line in the dependency file being read, step 54. The program then asks the question if the line starts with # or is blank, step 56. If that statement is true, the program proceeds to ask whether this is the last line 70, if it is the last line the program stops 72. If it is not the last line the program reads the next line in the dependency file, step 54. After the "if" statement the program proceeds to another "if" statement, asking whether the line is indented, step 58. If this statement is true, the program appends the last target to the rule list, step 59, if not already there. It also appends the line to the corresponding rule array entry, step 59. If the last "if" statement is not true, the program splits the line at the colon (:) mark, into target and prerequisite strings, step 60.

Next, the program performs Tcl substitutions in target string, step 62. Tokens in a target or prerequisite list which occur before the first token with a slash (\) in it are considered to be abstract. Abstract prerequisites trigger the rule in which they occur as target as though they were out of date files (whether they actually exist as files or not).

The program then expands path abbreviations in target and prerequisite strings, step 64. Then the program appends target to the requisition list, step 66. Next, the program stores prerequisites in corresponding requisition array entry, step 68. Then, the program will ask if this is the last line of the file, step 70, if it is, the program stops, step 72, if it is not the last line, the program proceeds to read the next dependency file, step 54.

Referring to FIG. 3, the use of the "process procedure" is further explained. The program reads each target in the target list, step 104. Then, for each specified target in the target list the program first finds a first match in the requisite list to the target, step 106, and retrieves the prerequisite list from the corresponding requisite array, step 106. Then, do all possible Tcl substitutions in the prerequisite list, including target for $trg, step 108. Next, for each prerequisite recursively process the prerequisite as a new target, step 110. Then, do all Tcl substitutions on the target, including $trg(s) and $src(s), step 112. Proceed to the "if" command, which reads, is the target concrete, step 114. If this is false, the program asks if this is the last target, step 120. If this last "if" statement is true, the program stops, step 122, if the "if" statement is false the program looks for matches for the next specified target in the target list, beginning with step 104.

If the "if" statement 114, "is the target concrete", is true, the program continues to another "if" statement 116. This "if" statement asks if the target is older than any prerequisite. The program is ascertaining if the target file needs to be including in a recompiling process. If any of the prerequisite files of that target file are newer then the target file, then the dependent file has been more recently updated, and the target file needs to be regenerated. Thus, if the answer is false, the program continues to the final "if" statement which asks is this the last target, step 120. If this is true it stops, step 122, if this is false, the program continues to look for the next specified target and a match for it, beginning with step 104. If the "if" statement 116, "is the target older than any prerequisite", is true, the program continues to execute the rule array member associated with this target to generate the target, step 118. Then, the program continues to the last "if" statement which asks if this is the last target, if this is true the program stops, step 122, if this is false, the program looks for the next specified target in the target list, beginning with step 104.

Examples of dependencies and update rules and other aspects of the present invention are explained below, using the preferred embodiment utility called updt, which provides further illustration and clarification of the present invention. Any of the more powerful scripting languages (for example, perl, python®, Tcl) could be used as the internal rule language. Also, the same scripting languages, or a compiled language such as, C or C++, could be used as implementation language.

The Tcl variables are set with "set variable-name variable-value" and references with "$variable-name". Also, in-line code evaluation is triggered with square brackets. Shell command quoting rules are determined by the Tcl environment, and are not the same as in a shell environment.

Updt is designed to support multi-directory builds from a single control file. For example, an updt rule can take the form:

hello.o: ./ hello.c
        exec cc hello.c The exec keyword is needed by Tcl for executing shell commands, and the './' before 'hello.c', tells updt to look in the current directory for that file. Updt relies on the variables in its underlying scripting language, preferably Tcl. These variables may be initialized as they would be in any Tcl script, e.g:

set CDIR [pwd]/src sets SCDIR to the 'src' subdirectory of the present working directory, and     set SRCS " "
    foreach f [glob -noncomplain $CDIR/* .c] {lappend
        SRCS $f} initializes $SRCS to all the *.c files in the
        'src' subdirectory.

Several variables are set automatically by updt. These include $1–$9 (parenthesized pattern sub-expressions), $trg (active target), $req (single prerequisite), $sreqs (changed prerequisite), and $reqs (all prerequisite). More variables can be devised.

Tcl procedures may be defined to improve the control file readability. For example:

proc filePathList {dir {patn *}} {
    # Generate list of file fullpaths in $dir matching pattern
        $patn
    # $patn defaults to '*'.
    set out " "
    forech f [glob -nocomplain $dir/$patn] {lappend out $f}
    return $out With this procedure defined in the Updtfile, the SRCS variable assignment in the previous example can be re-written as:

set SRCS [filePathList $CDIR]

This kind of embedded scripting language support is powerful, and can improve control file clarity.

Tokens in a target or prerequisite list which occur before the first token with a "/" in it are considered to be abstract.

Abstract prerequisites simply trigger the rule(s) in which they occur as target(s) as though they were out-of-date files (whether they actually exist as files or not).

The first token in the prerequisite (or target) list with a forward "/" slash in it sets the initial directory context for the rest of the prerequisites (or targets). The forward "/" slash sets the context to the current directory (the directory in which updt was invoked). This directory context can be dynamically changed, within the list, using additional path switches. For example, if the "*.o" files in the "obj" subdirectory, and the "*.a" libraries in the "lib" subdirectory. A typical library dependency might then look like:

./lib/libxx.a: obj/ f1.o f2.o f3.o

The trailing slash in the "obj/" token makes it a path switch, rather than a prerequisite. All subsequent prerequisites are considered to be prefixed with "(pwd)/obj/".

The path switch facility is important for concise specification of cross-directory dependencies. Path switches beginning with "/" are considered to be absolute path switches, completely overriding any prior path context. Other path switches are taken to be relative to the current path context. If the first path switch is relative, it is taken as relative to the current directory.

In summary, every target or prerequisite list which is intended to reference real files must initialize the directory context with a path switch before it lists those files. This behavior is appropriate for a tool designed for multi-directory builds from a single control file.

The updt utility relies on the use of target patterns. A sample rule in Updtfile can look like:

set patternType glob
(*).o: $1.c
    exec $CC $CFLAGS -c $req

The pattern type variable tells updt to interpret subsequent targets as glob (shell-like wild card) patterns with parenthesized sub-expressions. The $1 is a scripting language variable which evaluates to the first parenthesized sub-expression in the active target pattern. The $req refers to the single prerequisite. The $CC and $CFLAGS are just predefined variables in the scripting language.

This kind of pattern-based target specification increases the programmer's or user's flexibility and power in constructing rules. For example, if $sdir is a private directory containing the master copy of some files, and $tdir is a public directory meant to contain updated copies of those files, one can specify this dependency with:

$tdir/ (*): $sdir/$1
    exec cp -p $req $trg

Thus, a generic rule can be provided for updating any file in $tdir from the corresponding file in $sdir.

Regular expression patterns are more powerful than glob patterns, and may be needed in some cases. For example, suppose executable scripts (without suffixes) are to be generated from corresponding scripts with a ".src" suffice by a sed path substitution. This rule might be specified using regular expressions as follows:

set patternType regexp
bin/([^.]*$): bin/$1.src
    exec sed -e "s?actual_path?template_path?g" $reg >$trg This rule says that any concrete target in the bin directory which has no period in the name may be generated from the corresponding file in the bin directory with a ".src" extension via the supplied sed command.

When target patterns are used in updt control files, there are occasions when it is helpful to be able to specify the dependency and update rules associated with a given file separately.

When a particular concrete file is needed, updt preferably uses the prerequisites from the first matching target pattern with an associated prerequisite list, and the update rule from the first matching target pattern with an attached update rule. Consider the following updt control file:

inst/bin/(*): master/bin/$1
inst/bin/(*).e"
    exec sed -e "s?actual_path?template_path?g" $req >$trg
inst/bin/(*):
    exec cp -p $req $trg The first rule says that any file in the inst/bin directory depends on the corresponding file in the master/bin directory. The second rule says that any needed file in the inst/bin with a ".e" suffix can be created via a set substitution of its prerequisite. The third rule says that any needed file in the inst/bin should be simple a copy of its prerequisite. Because it comes after the ".e" rule, however, it does not get triggered for inst/bin/*.e files. It is only triggered by inst/bin files without a ".e" suffix.

The value of $req for the second two rules is determined from the first rule, which supplies the prerequisite list for every file in the inst/bin.

To reiterate, when searching for a dependency list or update rule to apply to a needed concrete target, update checks that target against the target patterns in the order in which those patterns are specified in the updt control file. For this reason, rules with more-specific target patterns should precede rules with less-specific target patterns.

The updt utility treats directory targets in a special manner, to support automatic recursive processing of their contents: Directory targets are always considered to be out-of-date. Thus, the rule associated with a directory target is always triggered when that directory is determined to be needed, regardless of the directory's actual status.

How does updt know whether it is dealing with a directory target or a file target? If the target entity does not exist, it does not matter. The target is always out-of-date in this case. If the target entity does exist, updt simply checks to see whether it is a directory or file, and if it is a directory, it considers it out-of-date regardless of its time stamp.

Another way updt supports automated processing of directory contents is by providing a process procedure for the user to call. The process procedure recursively invokes the updt engine on all its arguments.

To illustrate how updt's directory processing features might be used, suppose there is a target directory, $tdir, and the goal is to update all the files and subdirectories in it from a corresponding source directory, $sdir. The last updt control file rule in this case might look like:

```
$tdir/(*): $sdir/$1
    if [file isdirectory $req] then {
        file mkdir $trg
        foreach f [glob –nocomplain $req/* $req/.*] {
            if {$f != "." && $f != ".."} then {
                process $tdir/[file tail $req]
            }
        }
    } else {
        exec cp -p $req $trg
    }
```

The dependency establishes that every file or directory in the $tdir depends on the corresponding entity in $sdir. The update rule treats directories differently from files. Note that the update rule checks the type of $req, not $trg, since $trg may not exist yet.

For targets dependent on $req files (as opposed to dependant on $req directories), the user copies the prerequisite (file in $sdir) to the target (corresponding file in $tdir).

For targets dependent on $req subdirectories, the user first makes the corresponding $trg subdirectory, and then recursively invokes the updt engine on all of the entities in the $req directory (except '.' and '..'), using the three process command. This single rule states that $tdir is a recursive copy of the $sdir, but when it is triggered, only out-of-date files in $sdir will be copied to $tdir.

Suppose, for example, that for certain files (e.g files with a '.e' suffix) the user did not want a simple copy, the user wanted a sed substitution and then a copy. The user could then simply precede the above rule with:

$tdir/*.e:
    exec sed -e "s?actual_path?template_path?g" $req >$trg which would override the first update rule in the case of files with '.e' extensions. The prerequisite would still be determined from the more general dependency/update rule already described.

The method of the present invention may be embodied as a computer program product stored on a program storage device. This program storage device may be devised, made and used as a component of a machine utilizing optics, magnetic properties and/or electronics to perform the method steps of the present invention. Program storage devices include, but are not limited to, magnetic disks or diskettes, magnetic tapes, optical disks, Read Only Memory (ROM), floppy disks, semiconductor chips and the like. A computer readable program code means in known source code may be employed to convert the methods described below for use on a computer. The computer program or software incorporating the process steps and instructions described further below may be stored in any conventional computer, for example, that shown in FIG. 4. Computer 150 incorporates a program storage device 152 and a microprocessor 154. Installed on the program storage device 152 is the program code incorporating the method of the present invention, as well as any database information for the mask pattern of a feature to be created on the semiconductor substrate and the lithographic process window variations.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for updating existing code in a computer program after inputting new code which defines changes to said existing code comprising the steps of:
    generating a target file list of target files to update;
    generating a dependency file list of files dependent on said target files;
    reading said dependency file list of files into a control file, wherein selected lines of said files are split into target strings having programming language substitutions and being appended to a requisition list and into prerequisite strings being stored in corresponding requisite arrays; and
    executing an algorithm where said algorithm matches said target files with said substituted target string in said requisition list in said control file, and then said algorithm updating those matched target files if it is determined that the corresponding prerequisite strings stored in the corresponding requisite arrays in said control file have been updated more recently than said substituted target string.

2. The method of claim 1 further including source code and object code, said target files being source code and said dependency files being object code, said source code being selectively compiled to update said object code.

3. The method of claim 1 further comprising the step of:
    updating said prerequisite strings with new files defined by new code.

4. The method of claim 2 wherein said algorithm utilizes a search technique including pattern type variables which use generic rules to specify said object code for updating.

5. A method for generating changes and updating existing files and code in a computer program, comprising the steps of:
    reading existing target files and existing dependency files in said computer program;
    reading a plurality of said dependency files associated with said target files into a single control file, wherein selected lines of said dependency files are split into target strings and prerequisite strings;
    executing a utility program which updates said target files and said dependency files associated with said target files, said utility program including an interpreted scripting language specifying particular characters to search for in said target files and said associated dependency files;
    generating a requisition list of target strings having interpreted scripting language substitutions and corresponding requisite arrays for said prerequisite strings using said utility program; and
    updating said target files by employing a search technique defined in said utility program, said search technique includes specified target patterns such that said specified target patterns identify said existing target files being updated, said existing target files being updated if it is determined from said specified target patterns that said prerequisite strings in said control file have been updated more recently than said substituted target string.

6. The method of claim 5 wherein said specified target patterns of said search technique includes pattern type variables which use generic rules to specify said target files for updating.

7. The method of claim 5 wherein said search technique includes matching specified characters in said target files to said requisition list of target strings such that said specified characters identify said existing target files being updated.

8. The method of claim 5 wherein said utility program defines new target files to be added to said existing target files.

9. The method of claim 5 wherein the utility program prioritizes said target files to update while employing said search technique.

10. The method of claim 5 wherein said utility program includes a process procedure for an operator to call, said process procedure recursively invokes said utility program and arguments.

11. The method of claim 5 wherein said utility program is in a scripting language selected from the group consisting of updt, per, and Tcl.

12. The method of claim 5 wherein said utility program provides that said existing target files with a specific character are not considered to be a file, and thereby are bypassed for any changes by the utility program.

13. A computer program product for updating existing code in a computer program after inputting new code which defines changes to said existing code, said computer program product having:
    computer readable program code means for generating a target file list of target files to update;
    computer readable program code means for generating a dependency file list of files dependent on said target files;
    computer readable program code means for reading said dependency file list of files into a control file, wherein selected lines of said files are split into target strings having programming language substitutions and being appended to a requisition list and into prerequisite strings being stored in corresponding requisite arrays; and
    computer readable program code means for executing an algorithm where said algorithm matches said target files with said substituted target string in said requisition list in said control file, and then said algorithm updating said target files if it is determined that the corresponding prerequisite strings stored in the corresponding requisite arrays in said control file have been updated more recently than said substituted target string.

14. A program storage device readable by a machine, tangibly embodying a program of instructions executable by the machine to perform method steps for updating existing code in a computer program after inputting new code which defines changes to said existing code, said method steps comprising:
    generating a target file list of target files to update;
    generating a dependency file list of files dependent on said target files;
    reading said dependency file list of files into a control file, wherein selected lines of said files are split into target strings having programming language substitutions and being appended to a requisition list and into prerequisite strings being stored in corresponding requisite arrays; and
    executing an algorithm where said algorithm matches said target files with said substituted target string in said requisition list in said control file, and then said algorithm updating said target files if it is determined that the corresponding prerequisite strings stored in the corresponding requisite arrays in said control file have been updated more recently than said substituted target string.

15. A method for updating target files in a computer comprising:
    generating a target file list of target files to update;
    reading into a control file a list of files dependent on said target files;
    splitting selected lines of said dependent files into target strings and prerequisite strings;
    performing programming language substitutions in said target strings;
    appending said substituted target strings to a requisition list;
    storing said prerequisite strings in corresponding requisite arrays;
    executing an algorithm to match selected target files from said target file list to said substituted target string in said requisition list;
    retrieving said prerequisite strings from said corresponding requisite arrays;
    updating said prerequisite strings by performing all possible programming language substitutions to said prerequisite strings using said algorithm;
    identifying those prerequisite strings that have been updated more recently than said substituted target string to generate update rules using said algorithm; and
    updating said target files from said target file list using said update rules.

16. The method of claim 15 wherein after said list of files dependent on said target files are read into said control file, said remaining subsequent steps utilize said control file.

17. The method of claim 15 further including updating said target file list with new target files, the new target files being defined by said update rules.

18. The method of claim 15 wherein said update rules comprise target patterns to specify entire classes of dependencies.

19. The method of claim 15 wherein the update rules are specified using a scripting language selected from the group consisting of updt, perl , and Tcl.

20. The method of claim 19 wherein said algorithm is executed in said scripting language.

21. The method of claim 20 wherein said rules have access to said interpreted programming language to recursively invoke said algorithm on a new target.

22. The method of claim 15 wherein said prerequisite uses dynamic directory switching to specify multiple files in multiple directories.

23. The method of claim 15 further including a directory, said algorithm considering said directory to be out-of-date regardless of its time stamp such that any rule associated with directory target is always triggered.

24. A method for updating target files in a computer comprising:
    generating a target file list of target files to update;
    reading into a control file a list of files dependent on said target files;
    splitting selected lines of said dependent files into target strings and prerequisite strings;
    performing programming language substitutions in said target strings;
    appending said substituted target strings to a requisition list;
    storing said prerequisite strings in corresponding requisite arrays;
    executing an algorithm to match selected target files from said target file list to said substituted target string in said requisition list;
    retrieving said prerequisite strings from said corresponding requisite arrays;
    updating said prerequisite strings by performing all possible programming language substitutions to said prerequisite strings using said algorithm;
    identifying those prerequisite strings that have been updated more recently than said substituted target string to generate update rules using said algorithm, said update rules support multi-directory builds from a single control file; and
    updating said target files from said target file list using said update rules.

* * * * *